United States Patent [19]
Lee

[11] 3,741,605
[45] June 26, 1973

[54] VEHICLE WITH DETACHABLE AUXILIARY PARTS

[76] Inventor: Hue R. Lee, 3390 Peachtree Road, Altanta, Ga. 30326

[22] Filed: May 20, 1971

[21] Appl. No.: 145,129

[52] U.S. Cl.................... 296/10, 296/99, 296/103
[51] Int. Cl............................................. B62d 33/08
[58] Field of Search................. 296/10, 24 R, 28 K, 296/26, 35 A, 99, 103

[56] References Cited
UNITED STATES PATENTS

| | | | |
|---|---|---|---|
| 2,307,172 | 1/1943 | Vanhooser | 296/10 X |
| 2,120,918 | 6/1938 | Larsen | 296/24 R |
| 3,390,913 | 7/1968 | Hunter | 296/10 |
| 2,185,209 | 1/1940 | Love | 296/24 R |
| 3,508,786 | 4/1970 | Colville | 296/99 |

Primary Examiner—Benjamin Hersh
Assistant Examiner—John A. Pekar
Attorney—Jones & Thomas

[57] ABSTRACT

A passenger vehicle having a passenger cab at its front portion over its steerable wheels with front and rear passenger seating areas. The passenger cab is displaced forwardly of the rear non-steerable wheels and includes a sliding back door to allow passengers to pass into and out of the passenger cab toward the rear of the vehicle. Various auxiliary vehicle attachments can be attached to and carried by the rear portion of the vehicle, including a camper house, pickup truck sides and an auxiliary passenger van. The passengers can enter the auxiliary parts of the vehicle from the passenger cab through the sliding backdoor.

7 Claims, 4 Drawing Figures

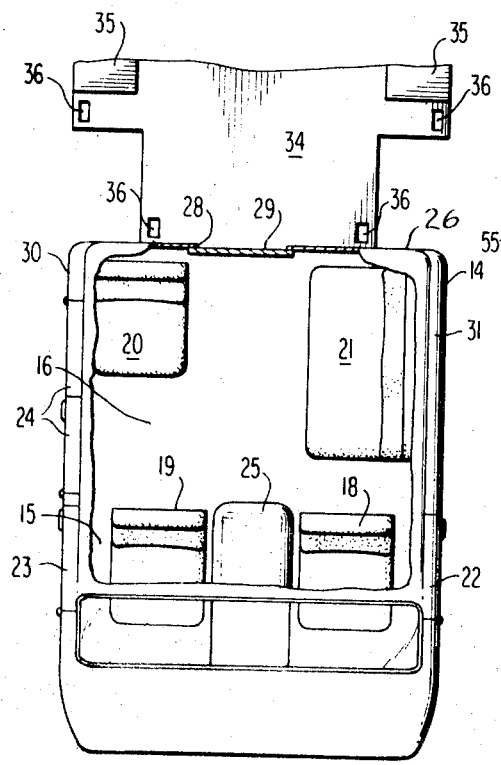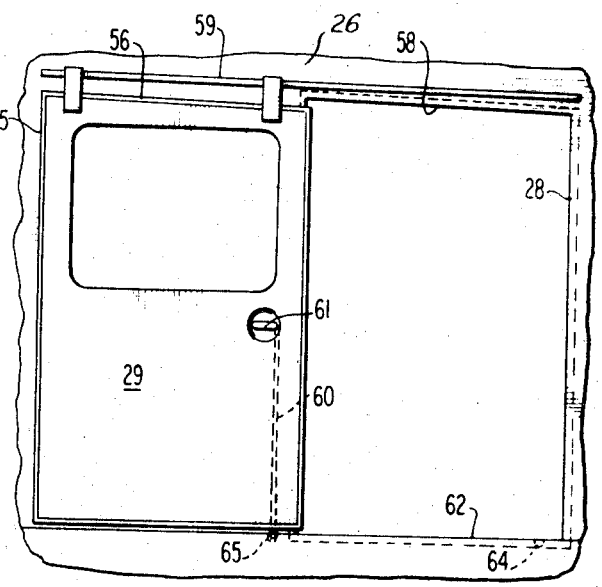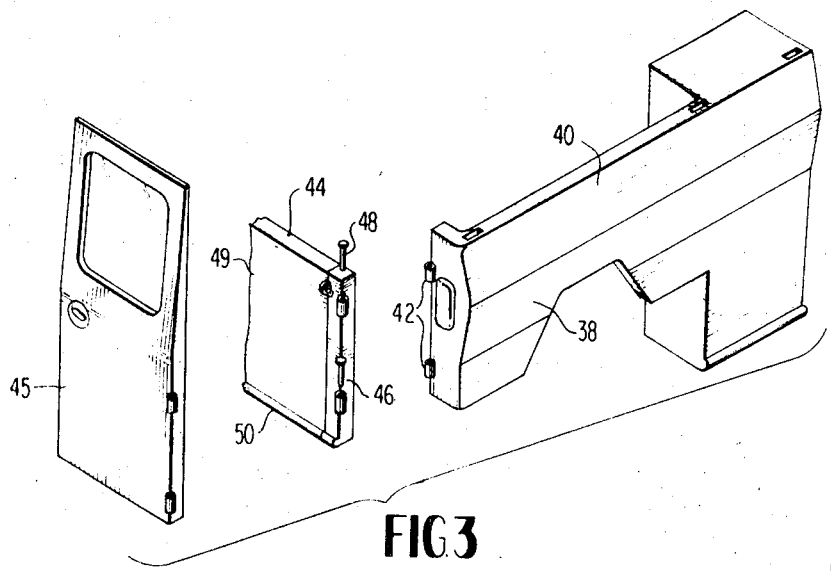

VEHICLE WITH DETACHABLE AUXILIARY PARTS

BACKGROUND OF THE INVENTION

Trucks and similar automotive passenger vehicles have been equipped with various attachments which make the vehicle more versatile for special occasions. For instance, pickup trucks now can be equipped with housings called "campers" that fit down into the sidewalls of the pickup body, and the truck can be utilized both as a transportation vehicle and as a temporary dwelling place. Also, various vehicles have been equipped with benches and canopies as detachable auxiliary equipment for the transportation of personnel, and various other temporary and permanent attachments for special purposes are commonly used. While trucks and their various attachments are highly useful in many situations, most of the vehicles include a functional disadvantage in that the passengers in the cab portion of the vehicle must exit a side door of the passenger cab in order to gain access to the rear portion of the vehicle and its auxiliary attachment. In the case of some auxiliary attachments, such as a camper or a vehicle equipped with a canopy for the purpose of transporting passengers, the lack of access and communication between the cab and the auxiliary attachment is inconvenient and cumbersome. Moreover, the placement of a door or other element in the rear wall of the cab of most vehicles is somewhat impractical because of the seating arrangement normally required at the driver's position of the vehicle and because of the presence of the transmission hump or engine hump which is usually present in the floor of most vehicles next to the driver's seat.

SUMMARY OF THE INVENTION

Briefly described, the present invention comprises a passenger vehicle including a passenger cab at the front of the vehicle with front and rear passenger seating areas, and a rear door in the passenger cab for allowing movement of passengers from the rear seating area through the rear wll of the cab into any auxiliary vehicle attachment carried on the rear of the vehicle behind the cab. A sliding door is present in the rear wall of the passenger cab and the floor area in the rear portion of the passenger cab is approximately flat so that passage through the rear door is generally unencumbered. The seats in the rear seating area are arranged to provide a passageway in the vicinity of the rear sliding door.

The detachable auxiliary parts connectable to the rear portion of the vehicle optionally include an opening which faces the passenger cab and allows a passenger to move through the rear sliding door of the passenger cab into the detachable auxiliary part.

Thus, it is an object of this invention to provide a passenger vehicle which can be equipped with various detachable auxiliary parts and which provides for passenger movement directly from the passenger cab at the forward portion of the vehicle to the detachable auxiliary parts at the rear portion of the vehicle.

Another object of this invention is to provide an inexpensive versatile vehicle capable of providing a multitude of functions with various different detachable auxiliary parts and which provides direct access from the passenger cab of the vehicle through a rear door opening of the passenger cab to the detachable auxiliary parts.

Other objects, features and advantages of the present invention will become apparent upon reading the following specification, when taken in conjunction with the accompanying drawing.

BRIEF DESCRIPTION OF THE DRAWING

FIG. 2 is a top view with parts in cross section of the vehicle.

FIG. 3 is a detail illustration of the manner in which a pickup truck tail gate can be attached to the sidewalls of a pickup truck auxiliary part, or how hinged doors are attached to the pickup truck auxiliary part.

FIG. 4 is a detail illustration of the sliding rear door of the passenger cab.

DESCRIPTION OF A PREFERRED EMBODIMENT

Figure 1:
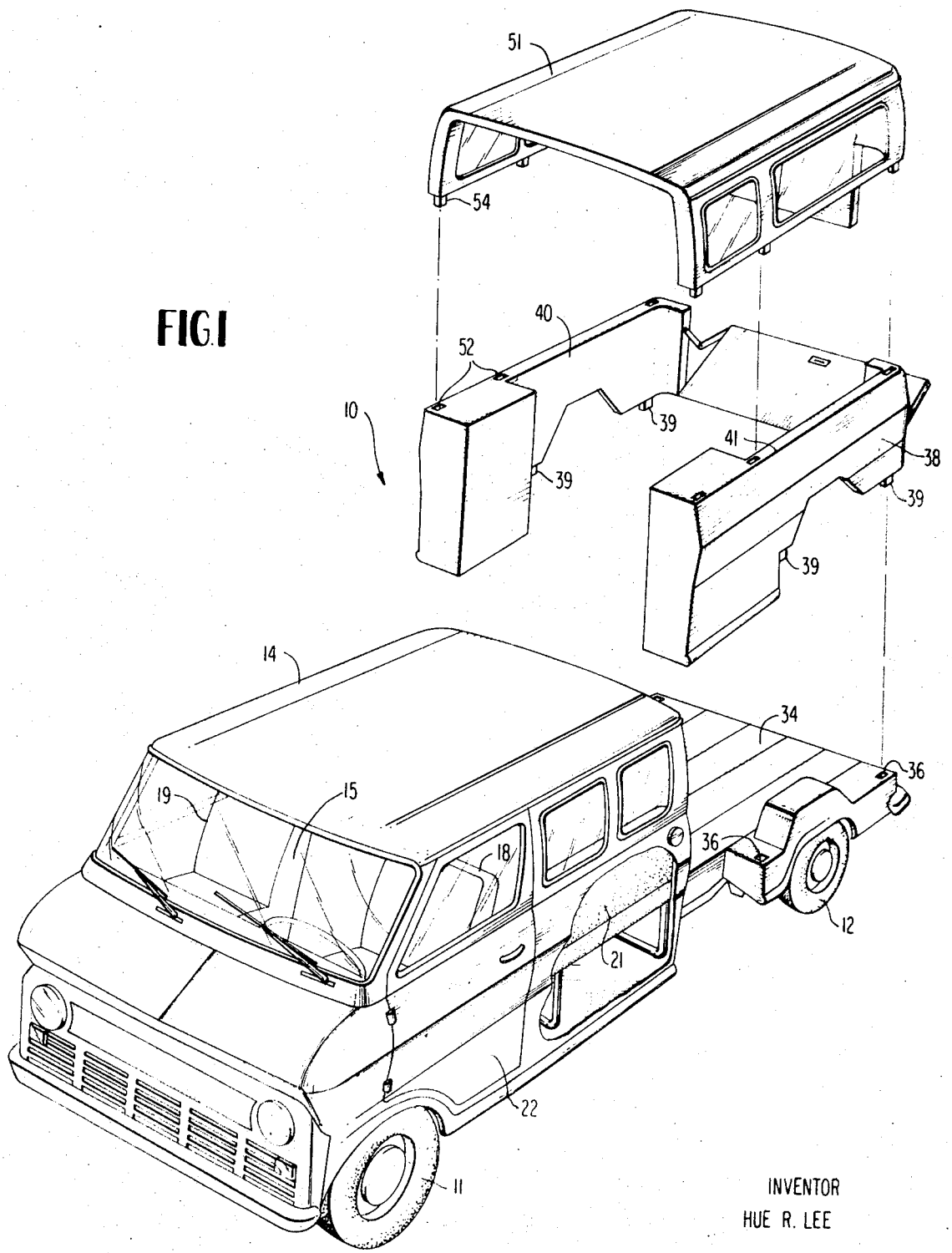
FIG. 1 is an exploded perspective view, with parts broken away, of the passenger vehicle.

Referring now in more detail to the drawing, in which like numerals indicate like parts throughout the several views, FIG. 1 shows a passenger vehicle 10 which includes front steerable wheels 11 and rear non-steerable wheels 12 which support a framework (not shown). Passenger cab 14 is mounted on the frame at the forward portion of the frame and generally over the front steerable wheels 11. Passenger cab 14 includes a front seat area 15 and a rear seat area 16, with a driver's seat 18 and a passenger's seat 19 in front seat area and a single passenger seat 20 and a double seat 21 in the rear seat area 16. Side doors are provided at the front seat area 15, including the driver's door 22 and the passenger's door 23. One or more side doors 25 are located in sidewall 30 of passenger cab 14 behind the passenger's door 23, to allow entry into the rear seat area 16. The sidewall 31 of passenger cab 14 across from rear side door 24 does not include a door opening, and double seat 21 is positioned with its back facing this sidewall. Single seat 20 is placed across from double seat 21 and a passageway is defined between seats 20 and 21 in the rear seat area 16. While the front seat area includes floor hump 25 between seats 18 and 19 to accommodate the engine, the rear floor of the rear seat area 16 is generally flat and unencumbered.

Rear or back wall 26 of passenger cab 14 includes door opening 28 and sliding door 29. Door opening 28 is slightly off center from the centerline of the vehicle and placed closer to sidewall 30 than sidewall 31. This arrangement allows door opening 28 to be of a convenient width and still allow sliding door 29 to be moved along rear wall 26 between the rear wall 26 and double seat 21 and open door opening 28.

The portion of the vehicle 10 behind passenger cab 14 includes a flat bed 34 which extends generally entirely across and covers the framework of the vehicle, and wheel fenders 35 over the rear non-steerable wheels 12. A plurality of rectangular attachment sockets 36 are located in flat bed 34 at various locations about the flat bed. Auxiliary parts such as pickup truck attachment 38 are mountable on the rear portion of vehicle 10 in juxtaposition with the back wall 26 of passenger cab 14. A plurality of connecting pins 39 extend downwardly from the pickup truck attachment and are spaced about the attachment so as to register with socket 36 in the flat bed 34 of the vehicle. When the connecting pins 39 are received in sockets 36, holding bolts, etc., (not shown) can be inserted through the mated pins and sockets to prevent inadvertent removal of the auxiliary parts from the basic vehicle.

Pickup truck attachment 38 includes sidewalls 40 and 41 which are spaced apart at their forward ends at passenger cab 14, leaving a space at the vicinity of passenger cab back door opening 28. This provides the necessary space for personnel movement between passenger cab 14 and the flat bed of the basic vehicle within the confines of pickup truck attachment 38. The rear ends of sidewalls 40 and 41 include spaced apart hinge elements 42 (FIG. 3), and pickup truck tail gate assembly 44 or rear doors 45 are connected to the hinge element. For instance, tail gate assembly 44 includes side supports 46 having spaced apart hinge pins 48 that are receivable in the hinge elements 42, and a tail gate 49 which is connected at its lower edge 50 with a hinged relationship with side supports 46. With this arrangement, tail gate assembly 44 can be placed adjacent and slightly above the rear edges of sidewalls 40 and 41 of the pickup truck attachment 38 and lowered to cause its hinge pins 48 to be received in the hinged elements 42 to connect the tail gate assembly to the pickup truck attachment.

Canopy or top 51 is connectable to pickup truck attachment 38 by means of sockets 52 in the upper surfaces of the pickup truck attachment 38 and connecting pins 54 along the lower surfaces of the canopy. When the canopy 51 is to be utilized with the pickup truck attachments to form an enclosed equipment cab or a passenger cab at the rear of the vehicle, rear doors 45 (FIG. 3) usually will be attached to the hinge elements 42 instead of tail gate assembly 44. Rear doors 45 are connectable to the pickup truck attachment by inserting hinge pins on the doors into the hinge elements 42 at the rear edges of the pickup truck attachments.

With the pickup truck attachment 38 connected to vehicle 10, or with both the pickup truck attachment and canopy 51 connected to the basic vehicle, the rear door opening 28 and rear door 29 provide ready access between passenger cab 14 and the detachable auxiliary parts. This allows the assembled vehicle to be utilized as a temporary dwelling, as a camper, etc., or as a personnel or equipment carrier, and the entire vehicle, including the rear portion of the vehicle as well as the passenger cab, can be utilized without leaving the vehicle. The placement of seats 20 and 21 in the rear seat area 16 and the flat floor surface in the rear seat area allows complete freedom of movement through the back door of the vehicle.

While a piecemeal or take apart vehicle structure including a pickup truck attachment and a canopy for the pickup truck attachment has been illustrated, it will be understood by those skilled in the art that other plural or generally unitary structures can be utilized in a similar manner. For instance, an entire camper body, a delivery van housing, or wooden sides can be attached to the rear portion of the vehicle. In each of these examples, the attachments can be structured so as to provide a passageway which registers with the rear door opening 28 of the passenger cab to provide freedom of personnel movement between the passenger cab and the detachable auxiliary parts.

Since the basic vehicle is likely to be used at various times in a configuration so that its rear sliding door 29 is exposed to the outside environment, it is desirable to form the door and door opening with sliding door seals or gaskets. As is illustrated in FIG. 4, door 29 includes resilient gasket 55 about its edges, and the upper surface 56 of the door is inclined slightly at an angle which corresponds to the incline of the upper edge of door opening 28. The door is mounted with rollers on an inclined track 59 so that the door tends to move toward its closed position. When the door moves into its fully closed position, its inclined upper edge 56 wedges against the inclined edge 58 of door opening 28 to form an air tight seal. The latching mechanism for the door includes a locking bar 60 inside the door which extends from handle 61 down toward the lower sill 62 of the door opening. Locking bar 60 can be inserted in notch 64 when the door is closed on into notch 65 when the door is wide open. This arrangement functions to hold the door completely closed or completely open.

While this invention has been described in detail with particular reference to preferred embodiments thereof, it will be understood that variations and modifications can be effected within the spirit and scope of the invention as described hereinbefore and as defined in the appended claims.

I claim:

1. A passenger automotive vehicle comprising a frame including steerable wheels at its front portion and nonsteerable wheels at its rear portion, a passenger cab at its front portion generally above said steerable wheels and spaced forwardly from said nonsteerable wheels, said passenger cab including a rear door opening in its rear portion providing personnel access directly between said cab and a portion of said vehicle extending behind said passenger cab, said passenger cab defining a front seat area, a rear seat area, a driver seat and a passenger seat in the front seat area, and passenger seat on opposite sides of said rear door opening in said rear seat area, a rear door slidably mounted on the rear portion of said cab and arranged to slide to a closed position with respect to said rear door opening or alternately to slide to an open position with respect to said door opening behind one of the passenger seats in said rear seat area, and means for connecting auxiliary body elements to the rear portions of said frame behind said passenger cab generally above said nonsteerable wheels.

2. The vehicle of claim 1 and wherein a generally flat bed platform covers the portion of said frame extending rearwardly from said passenger cab.

3. The vehicle of claim 1 and further including an auxiliary body element connected to the rear portion of said frame behind said passenger cab generally above said nonsteerable wheels, said auxiliary body element defining a space in the vicinity of said rear door opening of said cab whereby the passengers in said cab have access to said auxiliary body element through said rear door opening.

4. The vehicle of claim 1 and further including a pickup truck body element comprising sidewalls placed along the side portions of said vehicle with the front portions of the sidewalls juxtaposed the rear of said passenger cab, and a tail gate assembly connected between the rear portions of said sidewalls.

5. The vehicle of claim 1 and further including a pickup truck body element comprising sidewalls placed along the side portions of said vehicle with the front portions of the sidewalls juxtaposed the rear of said passenger cab, and a pickup body top element comprising sidewalls extending upwardly from the side walls of the pickup truck body element and a top wall extending between the upper portions of said top element sidewalls, whereby a generally open ended rear cab is formed behind said passenger cab.

6. The vehicle of claim 1 and wherein one of the passenger seats in said rear seat area is positioned with its back portion facing the sidewall of said passenger cab behind the driver seat, and wherein said rear door opening is spaced from said side facing passenger seat a distance adequate to provide a personnel passage from said passenger cab to the space behind the passenger cab.

7. A passenger automotive vehicle comprising a frame, steerable wheels supporting the front portion of said frame and nonsteerable wheels supporting the rear portion of said frame, a passenger cab at the front portion of said frame generally above said steerable wheels and spaced forwardly from said nonsteerable wheels, a generally flat bed extending behind said passenger cab, said passenger cab including a rear door opening in its rear portion and a rear door arranged to close and open said rear door opening for providing personnel access directly between said passenger cab and said flat bed extending behind said passenger cab, at least one auxiliary body element sized and shaped to fit on said flat bed behind said passenger cab, and means for connecting auxiliary body elements to the rear portion of said frame behind said passenger cab on said flat bed generally above said nonsteerable wheels, whereby said rear door can be closed to separate said passenger cab from the portion of said vehicle behind said passenger cab or said rear door can be opened to provide personnel access directly between said passenger cab and said flat bed or any auxiliary body element connected to the rear portion of said frame.

* * * * *